INVENTOR
FRANK F. PAINTER
SAMUEL L. SEYMOUR

ATTORNEYS 3,606,443
GLASS GRIPPING TONGS
Frank F. Painter, Tarentum, and Samuel L. Seymour, Oakmont, Pa., assignors to PPG Industries, Inc., Pittsburgh, Pa.
Filed Dec. 27, 1968, Ser. No. 787,337
Int. Cl. B66c 1/48
U.S. Cl. 294—106                                      5 Claims

ABSTRACT OF THE DISCLOSURE

Tongs having a pair of lever arms pivoted to a lower tong member and extending beyond the lower tong member to carry glass engaging members, a pair of links pivoted between an upper tong member and one or the other tong arms and alignment means coupling said upper and lower tong members in such a manner to maintain the tongs in vertical alignment so that the glass engaging members at the lower end of the lever arms are horizontally aligned when the tongs engage a glass sheet suspended for thermal treatment.

---

This invention relates to glass gripping tongs suitable for supporting glass sheets during thermal treatment of the type necessary in the fabrication of various glass products that require high temperatures during certain fabrication operations such as enameling, bending, tempering, pyrolizing a metal oxide coating upon application of a metal salt, etc.

It is known to be advantageous to suspend glass sheets vertically during such thermal treatment in order to prevent the warping or sagging of the heated glass sheets under their own weight. Tongs utilized to suspend glass sheets are self-gripping tongs provided with glass engaging members which grip the cold glass with sufficient force to prevent the suspended sheets from slipping. When the temperature is raised to the softening point, the glass engaging members enter the glass mass, the penetration being deeper when the pressure is greater. To reduce the dimensions of the marks made by the penetrating glass engaging members, it is customary to reduce the tong pressure by increasing the number of tongs used to suspend heavy glass sheets, but this pressure reduction has a practical limitation, because it is impractical to load individual glass sheets into a large number of tongs on a mass production basis.

Attempts were made to use tongs having sharp pointed tips as glass engaging members, but they soon lose their sharpness, while the tong marks they produce frequently tend to induce fractures which are detrimental to the preservation of the glass articles, because the sharp tips penetrate more deeply into the glass, modify its internal strains, and establish areas of reduces strength.

In copending application Ser. No. 782,115 of Samuel L. Seymour filed Dec. 9, 1968, there is disclosed and claimed tongs provided with glass engaging members having glass engaging surfaces of circumferential contour. The glass engaging members may be set screws having a concavely shaped recess at the glass engaging ends or metal tubes or sleeves, supported at the lower end portions of pivoted lever arms that oppose one another. In each embodiment, the glass engaging members engage the opposite surface of a suspended glass sheet in circumferential lines of engagement. The tong arms and glass engaging members are preferably constructed and arranged in such a manner that the glass engaging surfaces move horizontally along a common axis when they engage the opposite surfaces of a glass sheet of the requisite thickness, and are in approximately the same plane when they engage glass sheets of thickness that differ from the requisite thickness by an acceptable tolerance.

Thermally treated glass sheets gripped by tongs constructed according to the invention disclosed in the aforesaid application Ser. No. 782,115 of Samuel L. Seymour have better optical properties in the tong-gripped areas than thermally treated glass sheets gripped by tongs having pointed or convexyl rounded glass engaging surfaces on their glass engaging members. The reason for this improvement in optical properties is thought to be due to the fact that when glass is compressed in thickness between opposed pointed or convexly rounded members, the glass thickness increases in the area immediately surrounding the compressed area. This causes the optical flatness of the glass to be impaired, thus resulting in a lens effect producing optical distortion. However, when heated glass is gripped between circumferentially extending surfaces, the glass is displaced both outside and inside the ring of compression caused by the circumferential gripping members and the glass thickness expands on both sides of the resulting ring of compression. Thus, the optical distortion resulting from gripping the glass between glass engaging members of circumferential configuration is minimized and is less visible to the human eye than distortion resulting from glass engagement by pointed or convexly rounded engaging members.

It has been found that when the glass engaging members of such tongs are out of perfect horizontal alignment when they engage the opposite surfaces of a heat-softened glass sheet, that the circular marks produced by the tongs engaging the heat-softened glass become misaligned and are more likely to be visible to an observer than marks from tongs whose glass engaging members contact the glass in perfect horizontal alignment.

The present invention provides structure for free hanging glass engaging tongs that minimizes the possibility that the glass engaging members will be out of horizontal misalignment when the glass engaging members contact the glass sheet. Tongs according to the present invention are provided with additional structure that insures that the tongs are suspended vertically and do not become skewed during a glass sheet engagement operation. Furthermore, tongs constructed according to the present invention are readily disengaged from a suspended glass sheet and have novel stop means that limit the maximum amount of separation between the glass engaging members and additional stop means that limit the minimum amount of separation between said glass engaging members.

The tongs according to the present invention are illustrated in the accompanying drawings which form part of a description of an illustrative embodiment of the invention. In the drawings.

Figure 2:
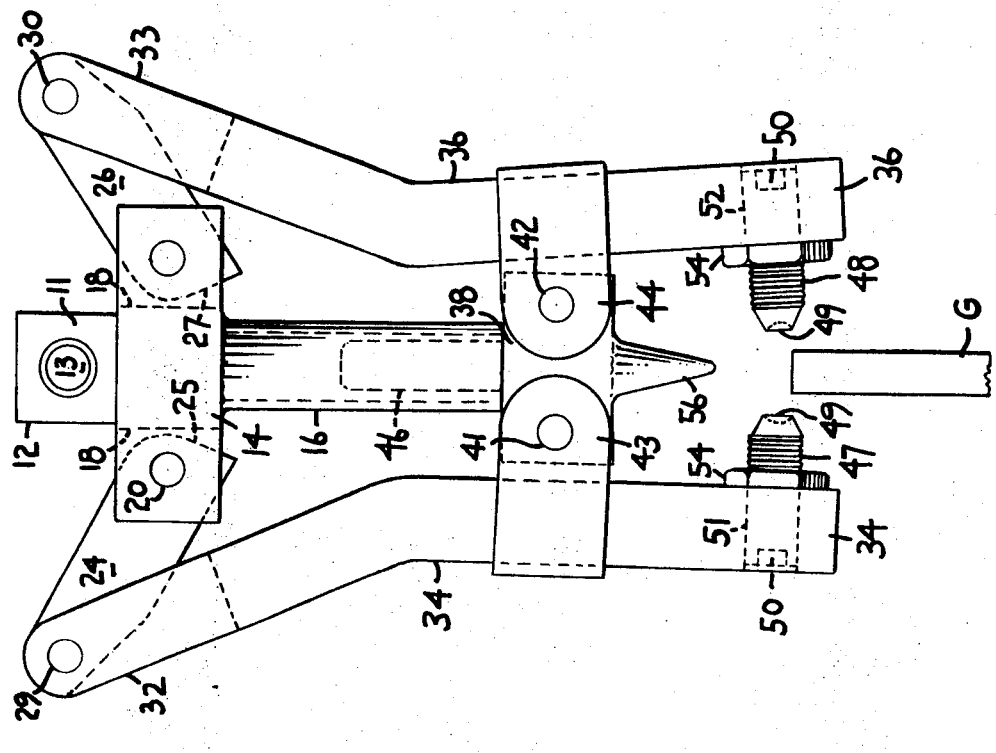
FIG. 2 is a view similar to FIG. 1 showing the tongs with their glass engaging members separated from one another the maximum amount permitted by stop members forming a part of the novel tong structure.

The tongs illustrated in the drawings comprise an upper tong member 11 in the form of an inverted T in elevation. The member 11 comprises a vertically disposed bar 12 having an aperture 13 in its upper portion and having a pair of horizontal arms 14 attached to the outer surfaces of its lower portion 15 to present an appearance of the letter H in plan. The aperture 13 receives a hook or eye that is rigidly attached to a carriage (not shown) that rides an overhead conveyor (also not shown) and serves as hanging means on said upper tong member to permit the tongs to hang freely from said hook as is conventional in the art. The horizontal arms 14 are apertured near their opposite ends and are separated from one another by a distance equal to the thickness of the lower portion 15 of the bar 12 therebetween. A hollow sleeve 16 extends vertically downward from the lower surface of the lower portion 15 of the bar 12. The lower portion 15 of the bar 12 has a pair of vertical end walls 18 that extend downward in parallel vertical planes.

As stated previously, the horizontal arms 14 are each provided with a pair of apertures. Reference numbers 20 and 22 refer to these apertures. Apertures 20 are ailigned with one another along a common horizontal axis and apertures 22 are aligned with one another along another common horizontal axis in the same horizontal plane as the common axis for horizontal apertures 20.

A link 24, having an inner end portion 25 that is rounded at its upper end portion and straight along its lower end portion, has an inner aperture aligned with apertures 20 of the horizontal arms 14. A similar link 26, having an inner end portion 27 that is the mirror image of the inner end portion 25 of link 24, is similarly apertured at its inner end portion for alignment with apertures 22 of the horizontal arms 14. Pins secure the links 24 and 26 in pivoted relation to the opposite end portions of horizontal end arms 14.

The straight lower portions of the inner end portions 25 and 27 of the respective links 24 and 26 serve as stops to prevent further rotation of the links 24 and 26 once the links attain a near horizontal orientation. To accomplish this end, the straight lower portions abut vertical walls 18.

Links 24 and 26 are apertured adjacent their outer ends at outer link apertures 29 and 30, respectively. The outer link apertures 29 and 30 are pivotally attached respectively by pins to apertures extending in coaxial alignment through upper bifurcated portions 32 and 33 of lever arms 34 and 36.

The tongs are also provided with a lower tong member 38 having a pair of apertures 41 and 42 extending in a common horizontal plane along axes parallel to those of the previously described apertures. A pair of apertured fingers 43 and 44 are pivoted to apertures 41 and 42, respectively. The fingers are rigidly attached to the lever arms 34 and 36 and extend horizontally inward therefrom. Additional pins pivotally connect the apertured fingers 43 and 44 to the respective apertures 41 and 42 of the lower tong member 38.

The distance between apertures 41 and 42 is preferably chosen to be approximately equal to the thickness of the glass sheets handled. However, since tongs are used to process many different glass thicknesses, the distance between these apertures may be chosen to approximate the middle of the range of glass thicknesses processed. In fact, as much as ½ inch difference between the center to center distance between said apertures and the thickness of glass processed can be tolerated when the vertical distance between the horizontal plane common to said apertures and that common to said glass engaging members is about 1½ inch. Such as tong structure grips the opposite surfaces in a manner that produces acceptable optical properties in the fabricated glass. In the drawings, the glass sheet G is near the minimum thickness of the rang of thicknesses treated using the illustrated tongs.

An elongated rod 46 extends upward from the lower tong member 38 in a vertical direction and is concentric with the sleeve 16 that extends vertically downward from the upper tong member 11. The sleeve 16 and the elongated rod 46 are in sliding relation to one another.

Figure 1:
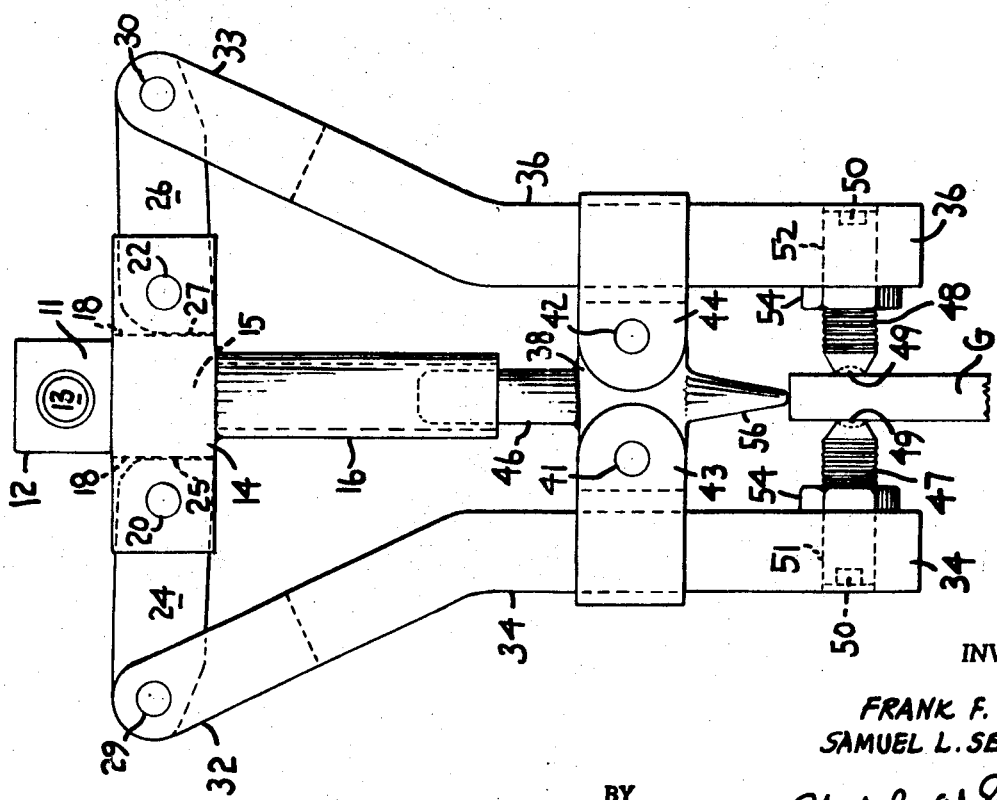
FIG. 1 is an elevational view of a set of tongs in the glass engaging position.

The lower ends of the lever arms 34 and 36 are provided with glass engaging members 47 and 48, respectively. Each of the glass engaging members has a cylindrical form terminating in a glass engaging surface 49 of concave cross section. The glass engaging members 47 and 48 are in the form of set screws having a concavely shaped recess 49 at the glass engaging end and a socket 50 for receiving the head of an Allen wrench at the other end. The lever arms 34 and 36 are provided with internally threaded passages 51 and 52, respectively, which extend horizontally in a direction normal to the previously described apertures when the tongs are in a glass engaging position, such as depicted in FIG. 1. The positions of the glass engaging members 47 and 48 are axially adjustable by manipulating an Allen wrench at their sockets 50. Lock nuts 54 are provided in screw-threaded relation about the threaded shafts of the set screws 47 and 48 secure the set screws in proper position.

The set screws are preferably of a hard metal or of a metal or metal alloy that does not form a flaky oxide coating in the temperature range at which glass sheets are processed for operations such as bending, tempering and coating. Suitable materials meeting the aforesaid requirements include stainless steels, titanium, tungsten or tungsten carbide and a metallic alloy sold under the trade name of "Stellite." It is obvious that this list of suitable materials is not all inclusive. Alternatively, the glass engaging members may be metal set screws having a coating of titanium or tungsten or tungsten carbide or "Stellite" or the like at its glass engaging surface 49. Such coatings are preferably formed by flame spraying.

In addition, a stop member 56 is attached to the lower tong member 38 and extends vertically downward therefrom to provide an upper glass edge engaging member that engages the upper edge of a glass sheet G and limits the upper position that the glass sheet upper edge can reach to one where the glass engaging members 47 and 48 contact the glass sheet during thermal treatment where the fabricated sheet will be hidden by a glazing frame when installed.

The upper portions of lever arms 34 and 36 diverge upwardly and outwardly from one another above the horizontal plane of the pivot means comprising the pins that engage apertures 41 and 42 to the apertures of the fingers 43 and 44. This divergence enables the glass engaging members 47 and 48 to separate whenever an inwardly directed force having a horizontal component is applied to the upwardly and outwardly divergent portions of the lever arms. Therefore, the glass engaging members separate without lifting the upper tong member 11 when the glass sheet is released after processing so that the tongs can remain suspended without lifting the carriage from which the tongs hang off the overhead conveyor along which the tong-carrying carriages travel.

The fact that the elongated rod 46 extending upward from the lower tong member 38 is overlapped by sleeve 16 which extends vertically downward from the upper tong member 11 insures that the upper and lower tong members 11 and 38 remain in vertical alignment with one another, thereby insuring that the glass engaging surfaces 49 of the glass engaging members 47 and 48 are in horizontal alignment with one another when the tongs are freely suspended. This horizontal alignment of the glass engaging members precludes any optical distortion that might result from overlapping circles of engagement on opposite glass sheet surfaces.

The lengths of the sleeve 16 and of the rod 46 are so chosen that the bottom end of the sleeve 16 comes into contact with the top surface of the lower tong member 38 to limit the maximum amount of the separation between the glass engaging members 47 and 48. The sleeve 16 and the rod 46 serve as alignment members of vertical alignment means for the tongs. The lower end of the sleeve 16 and the upper surface of the lower tong member 38 cooperate to form stop means for limiting the maximum amount of separation between said glass engaging members. Such stop means is referred to hereafter as first stop means. It is obvious that the links of the sleeve and rod could be chosen such that the upper end of the rod 46 could engage the lower surface of the upper tong member 11 to form said first stop means.

The fingers 43 and 44 comprise means pivotally connecting lever arms 34 and 36 to the lower tong member 38 intermediate their bifurcated upper end portions 32 and 33 and their lower end portions. To facilitate disengagement of a glass sheet, the lever arms 34 and 36 diverge upwardly away from one another. Links 24 and 26 are rounded at the upper portions of their inner end portions 25 and 27 to be free to pivot upward until further pivoting is stopped by the first stop means. The lower portions of the inner end portions 25 and 27 of links 24 and 26 are straight to prevent said links from pivoting beyond a near horizontal position depicted in FIG. 1. Hence, the structure of the inner end portions of links 24 and 26 cooperates with that of the end walls 18 of the upper tong member 11 to provide a stop that limits the minimum amount of separation between the glass engaging members 47 and 48. This stop is referred to in the claims as the second stop means.

From the above description, it is apparent that the pins extending through the apertures 41 and 42 and the apertured fingers 43 and 44 are means that pivotally connect each of the lever arms 34 and 36 to the lower tong members 38 intermediate its upper end portion and its lower end portion. Furthermore, the sleeve 16 and the elongated rod 46 comprise alignment members in concentric relation with one another and relatively movable with respect to one another to form alignment means for said tongs. The sleeve 16 and elongated rod 46 are relatively movable with respect to one another along a common axis that extends through the center of gravity of the tongs. This causes the tongs to hang freely in a vertical plane when freely suspended from a hook or eye through aperture 13 with the upper tong member 11 and lower tong member 38 in vertical alignment.

The form of the invention shown and described above represents an illustrative preferred embodiment thereof. It is understood that various changes such as reversing the position of the sleeve 16 and the elongated rod 46 and other structural modifications of a similar nature such as using pointed or rounded glass engaging members instead of the cup-shaped type described in the illustrative embodiment, and other like changes may be made without departing from the spirit of the invention as defined in the claimed subject matter which follows.

What is claimed is:

1. Freely hanging tongs for suspending glass in a vertical plane comprising an upper tong member, a lower tong member in spaced relation to said upper tong member, a pair of pivots for each of said tong members, a pair of links, each having an inner end portion pivoted to one or the other of said pivots for said upper tong member and an outer end portion, hanging means on said upper tong member for supporting said free hanging tongs, said hanging means constituting the only support for said free hanging tongs, a pair of lever arms, each having an upper end portion and a lower end portion, one of said upper end portions being pivoted to one of said outer end portions, the other of said upper end portions being pivoted to the other of said outer end portions, a glass engaging member attached to each of said lower end portions and extending inward toward the other glass engaging member, means comprising said pair of pivots for said lower tong member pivotally connecting each of said lever arms to said lower tong member intermediate its upper end portion and its lower end portion, and alignment means consisting essentially of a first alignment member extending downward from said upper tong member and a second alignment member in concentric relation to said first alignment member extending upward from said lower tong member, said alignment members being relatively movable with respect to each other along a common axis, said common axis extending through the center of gravity of said tongs, said lower tong member being free of any means for supporting said freely hanging tongs so that said lower tong member is freely suspended from said upper tong member and said lower tong member can be maintained in vertical alignment with said upper tong member while operating, further including first stop means comprising an end of one of said alignment members and a surface of one of said upper tong members that come into engagement to limit the maximum amount of separation between said glass engaging members, and, second stop means comprising the inner end portion of said links and end walls of said upper tong member that come into engagement when said links pivot about said pair of pivots for said upper tong member to limit the minimum amount of separation between said glass engaging members.

2. Tongs as in claim 1, wherein said alignment members comprise an elongated rod extending from one of said tong members toward said other tong member and a concentric sleeve extending from said other tong member toward said one tong member, said sleeve overlapping said rod.

3. Tongs as in claim 1, further including an upper glass edge engaging member attached to said lower tong member and extending downward therefrom.

4. Tongs as in claim 1, wherein each of said lever arms is pivotally connected to said lower tong member about an independent pivot means, said pivot means being horizontally aligned with one another and separated from one another a distance that differs from the thicknesses of glass sheets processed by said tongs by a maximum distance of about ½ inch.

5. Trongs as in claim 1, wherein each of said lever arms has an upwardly and outwardly diverging portion above said means pivotally connecting said lever arms to said lower tong member, whereby an inwardly directed force having a horizontal component causes said glass engaging members to separate when said force is applied to said upwardly and outwardly diverging portions.

References Cited

UNITED STATES PATENTS

| | | | |
|---|---|---|---|
| 84,510 | 12/1868 | Riker | 294—106 |
| 93,761 | 8/1869 | Spring | 294—106X |
| 539,132 | 5/1895 | James | 294—106X |
| 775,370 | 11/1904 | Lacey | 294—106X |
| 2,191,170 | 2/1940 | Keehn et al. | 294—106X |
| 2,712,469 | 7/1955 | Burnor | 294—106X |
| 2,757,038 | 7/1956 | Drill | 294—106 |
| 3,061,357 | 10/1962 | Wright | 294—106 |
| 3,107,716 | 10/1963 | Wehmeyer | 294—106X |
| 3,139,302 | 6/1964 | Orloff et al. | 294—106X |
| 3,263,535 | 8/1966 | Zurcher | 294—106X |
| 1,172,915 | 2/1916 | Stevens | 294—118X |
| 1,669,641 | 5/1928 | Zeitler | 294—118 |

FOREIGN PATENTS

| | | | |
|---|---|---|---|
| 1,111,785 | 7/1961 | Germany | 294—106 |
| 1,290,318 | 3/1969 | Germany | 294—106 |

EVON C. BLUNK, Primary Examiner

W. S. CARSON, Assistant Examiner